United States Patent
Shimizu et al.

[11] Patent Number: 6,053,273
[45] Date of Patent: *Apr. 25, 2000

[54] STEERING SYSTEM FOR VEHICLE

[75] Inventors: Yasuo Shimizu; Hiroshi Tabata, both of Wako, Japan

[73] Assignee: Honda Giken Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/833,173

[22] Filed: Apr. 4, 1997

[30] Foreign Application Priority Data

Apr. 8, 1996 [JP] Japan ................................. 8-085510

[51] Int. Cl.[7] .......................................... B62D 5/04
[52] U.S. Cl. ........................... 180/444; 180/400; 180/425
[58] Field of Search ...................... 180/400, 417, 180/425, 430, 443, 444, 446; 74/501.6, 502, 502.4; 280/771, 774

[56] References Cited

U.S. PATENT DOCUMENTS

| | | | |
|---|---|---|---|
| 976,115 | 11/1910 | Bard ......................................... | 180/443 |
| 3,747,428 | 7/1973 | Waner et al. ............................. | 280/771 |
| 3,869,138 | 3/1975 | Allison .................................... | 180/425 |
| 4,023,434 | 5/1977 | Axelsson ................................. | 280/771 |
| 4,183,421 | 1/1980 | Brown ..................................... | 180/430 |
| 4,449,420 | 5/1984 | Baba ....................................... | 280/774 |
| 4,986,380 | 1/1991 | Morishita ................................ | 180/446 |
| 5,598,897 | 2/1997 | Sugiura ................................... | 180/417 |
| 5,893,426 | 4/1999 | Shimizu et al. ......................... | 180/400 |
| 5,924,517 | 7/1999 | Sugiura ................................... | 180/417 |
| 5,924,520 | 7/1999 | Ehara et al. ............................. | 180/444 |

FOREIGN PATENT DOCUMENTS 0 174 202A2  3/1986  European Pat. Off. .
8-2431  1/1996  Japan .

*Primary Examiner*—J. J. Swann
*Assistant Examiner*—Michael Cuff
*Attorney, Agent, or Firm*—Arent Fox Kintner Plotkin & Kahn PLLC

[57] ABSTRACT

A steering system for a vehicle is provided in which each of the inner cables of two Bowden wires has one end thereof wound around and fixed to a driving pulley provided on a rotary shaft of a steering wheel, and the other end thereof is connected to a follower pulley. Spring sheets provided at end of outer tubes of the Bowden wires, are biased by springs and are connected to differential transformers. When a difference in tension corresponding to steering torque is generated between the two inner cables, the spring sheets are moved relative to each other, and a steering torque is determined based upon the amount of relative movement detected by the differential transformers. Thus, the steering torque inputted to the steering wheel can be correctly detected, while eliminating the influence of friction of the Bowden wires.

4 Claims, 6 Drawing Sheets

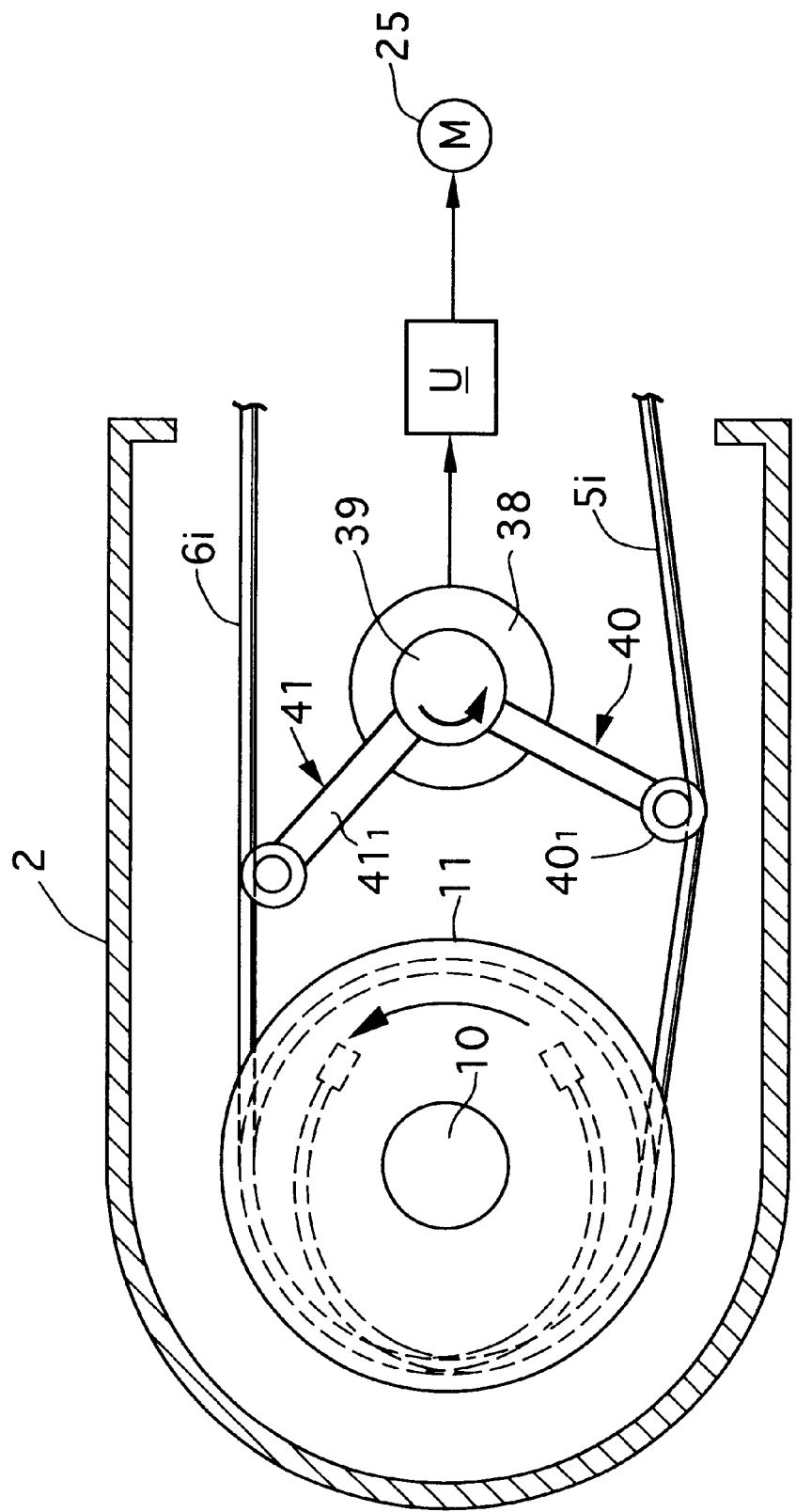

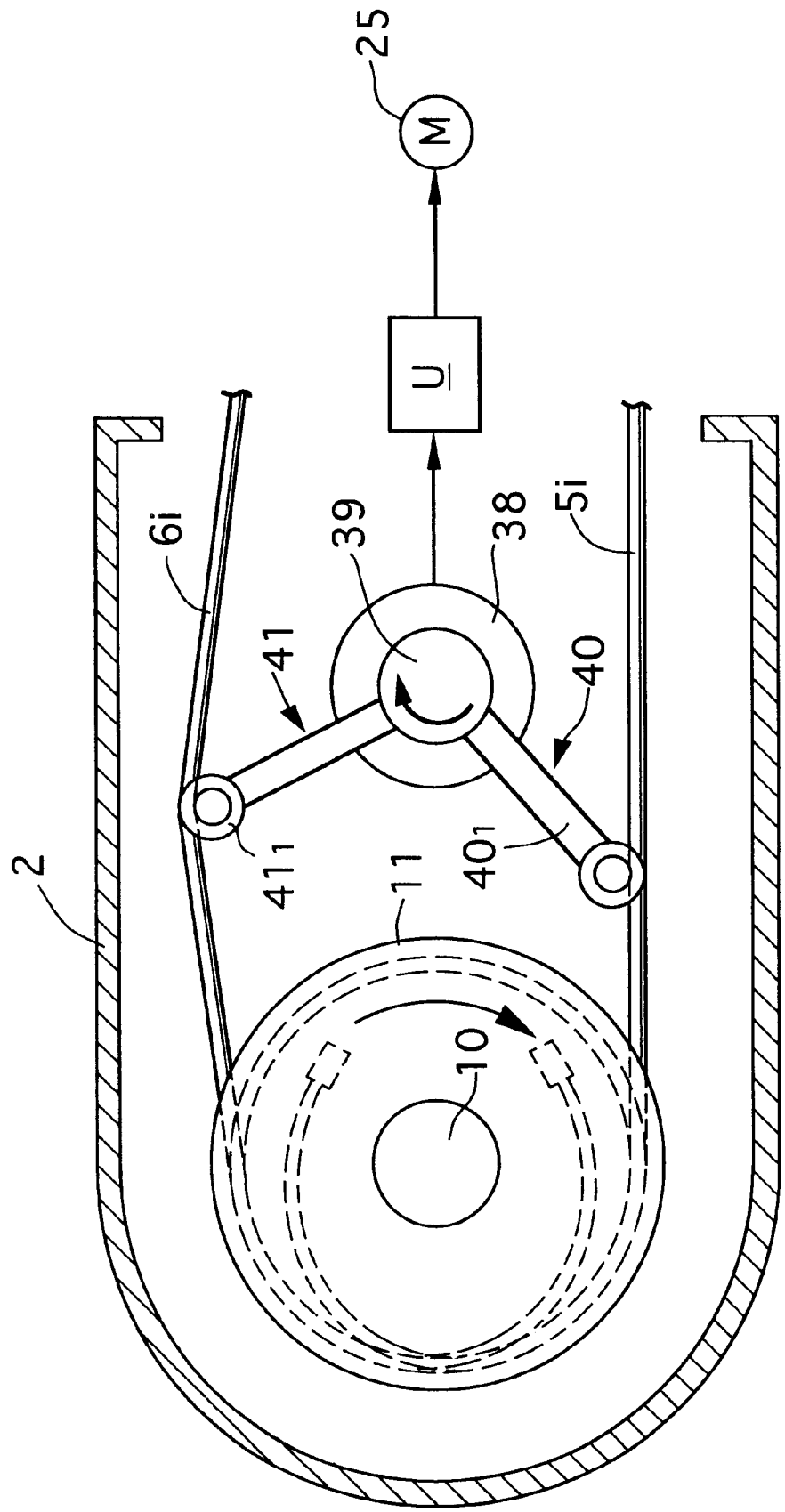

STEERING SYSTEM FOR VEHICLE

BACKGROUND OF THE INVENTION

1. Field of the Invention

The present invention relates to a steering system for a vehicle, including a driving pulley connected to a steering wheel and a follower pulley connected to a gear box for steering vehicle wheels. The driving and follower pulleys are interconnected by a wire, so that a steering torque inputted to the steering wheel is transmitted to the gear box through the wire.

2. Description of the Prior Art

A conventional steering system for a vehicle includes a steering shaft which has a steering wheel at its upper end and which is connected to a gear box at its lower end. Steering torque inputted to the steering wheel, is transmitted through the steering shaft to a rack and pinion mechanism provided within the gear box.

However, the conventional steering system has a problem because the steering wheel and the gear box are interconnected by the steering shaft, and it is difficult to freely select the position of the steering wheel relative to the gear box and hence, not only is freedom of design considerably limited, but also the gear box cannot be commonly used for a right-side steering wheel vehicle and a left-side steering wheel vehicle. Moreover, the conventional steering system has another problem in that vibration from a road surface to tires and vibration of the engine are applied to the steering wheel through the steering shaft. For this reason, silence within a vehicle compartment and the riding comfort are disturbed by the vibrations.

Therefore, it may be proposed that a flexible transmitting means such as a Bowden wire is used in place of the conventional steering shaft. In such a case, it is possible to freely select the position of the steering wheel relative to the gear box. Moreover, the vibration of the gear box is transmitted to the steering wheel and is substantially reduced and hence, the above-described problems can be overcome.

When the flexible transmitting means such as the Bowden wire is used in place of the conventional steering shaft, however, the friction provided by the sliding movement between the outer tube and the inner cable of the wire is significantly larger as compared with the friction of the conventional steering shaft. Therefore, the steering torque of the steering wheel is transmitted to the gear box through the wire which produces large friction. If a steering torque detecting means is provided within the gear box, it is difficult to accurately detect the steering torque due to the friction.

More specifically, when the steering torque inputted to the steering wheel increases, the steering torque is not wholly transmitted to the gear box due to the friction and as a result, there is a possibility that the steering torque is detected as a value smaller than an actual value. When the steering torque inputted to the steering wheel decreases, a portion of the steering torque provided theretofore remains in the gear box due to the friction and as a result, there is a possibility that the steering torque is detected as a value larger than an actual value. If the steering torque cannot be correctly detected for such a reason, it is difficult to appropriately control a power-steering motor, resulting in a reduced steerage feeling.

SUMMARY OF THE INVENTION

Accordingly, it is an object of the present invention to provide a steering system including a wire employed in place of the steering shaft, wherein influences of friction and elongation of the wire can be suppressed to a minimum in order to accurately detect the steering torque and prevent the reduction in steerage feeling.

To achieve the above object, according to a first aspect and feature of the present invention, there is proposed a steering system for a vehicle comprising a driving pulley connected to a steering wheel and a follower pulley connected to a gear box for steering vehicle wheels, the driving and follower pulleys being interconnected by a wire. The steering torque inputted to the steering wheel is transmitted to the gear box through the wire. The steering system further includes a steering-torque detecting means for detecting the steering torque at a position between the steering wheel and the follower pulley, a power-steering motor assisting the operation of the steering wheel, and a control means for controlling the power-steering motor based upon the steering torque detected by the steering-torque detecting means.

With the above arrangement, the influence of the friction and elongation of the wire can be suppressed to a minimum to correctly detect the steering torque and to prevent the reduction in steering feeling due to the generation of a detection error.

According to a second aspect and feature of the present invention, in the steering system for a vehicle, the steering-torque detecting means detects the steering torque based upon the tension of the wire. With this arrangement, it is possible to easily and reliably detect the steering torque based on the tension of the wire.

According to a third aspect and feature of the present invention, in a steering system for a vehicle, the wire comprises an outer member and an inner member, slidably inserted into the outer member. A steering-torque detecting means detects the steering torque based upon the amount of movement of the outer member in a longitudinal direction corresponding to a change in tension of the inner member.

With the above arrangement, it is possible to easily and reliably detect the steering torque based upon the amount of movement of the outer member in a longitudinal direction corresponding to the change in tension of the inner member.

According to a fourth aspect and feature of the present invention, in a steering system for a vehicle, the wire comprises an outer member, and an inner member slidably inserted into the outer member, and the steering-torque detecting means detects the steering torque based on the amount the inner member moves in a lateral direction thereof corresponding to a change in tension of the inner member.

With the above arrangement, it is possible to easily and reliably detect the steering torque based on the amount of movement of the inner member in the lateral direction corresponding to the change in tension of the inner member.

The above and other objects, features and advantages of the invention will become apparent from the following description of the preferred embodiments taken in conjunction with the accompanied drawings.

BRIEF DESCRIPTION OF THE DRAWINGS

FIGS. 1 to 3 illustrate a first embodiment of the present invention, wherein

FIG. 1 is a perspective view of the steering system for a vehicle;

FIG. 2 is an enlarged sectional view taken along a line 2—2 in FIG. 1;

FIG. 3 is an enlarged sectional view taken along a line 3—3 in FIG. 1;

FIG. 5 is a view similar to FIG. 2, but illustrating a third embodiment of the present invention when the vehicle is steered leftwards; and FIG. 6 is a view similar to FIG. 2, but illustrating the third embodiment of the present invention when the vehicle is steered rightwards.

DETAILED DESCRIPTION OF THE PREFERRED EMBODIMENTS

The present invention will now be described by way of a first embodiment with reference to FIGS. 1 to 3.

Figure 1:
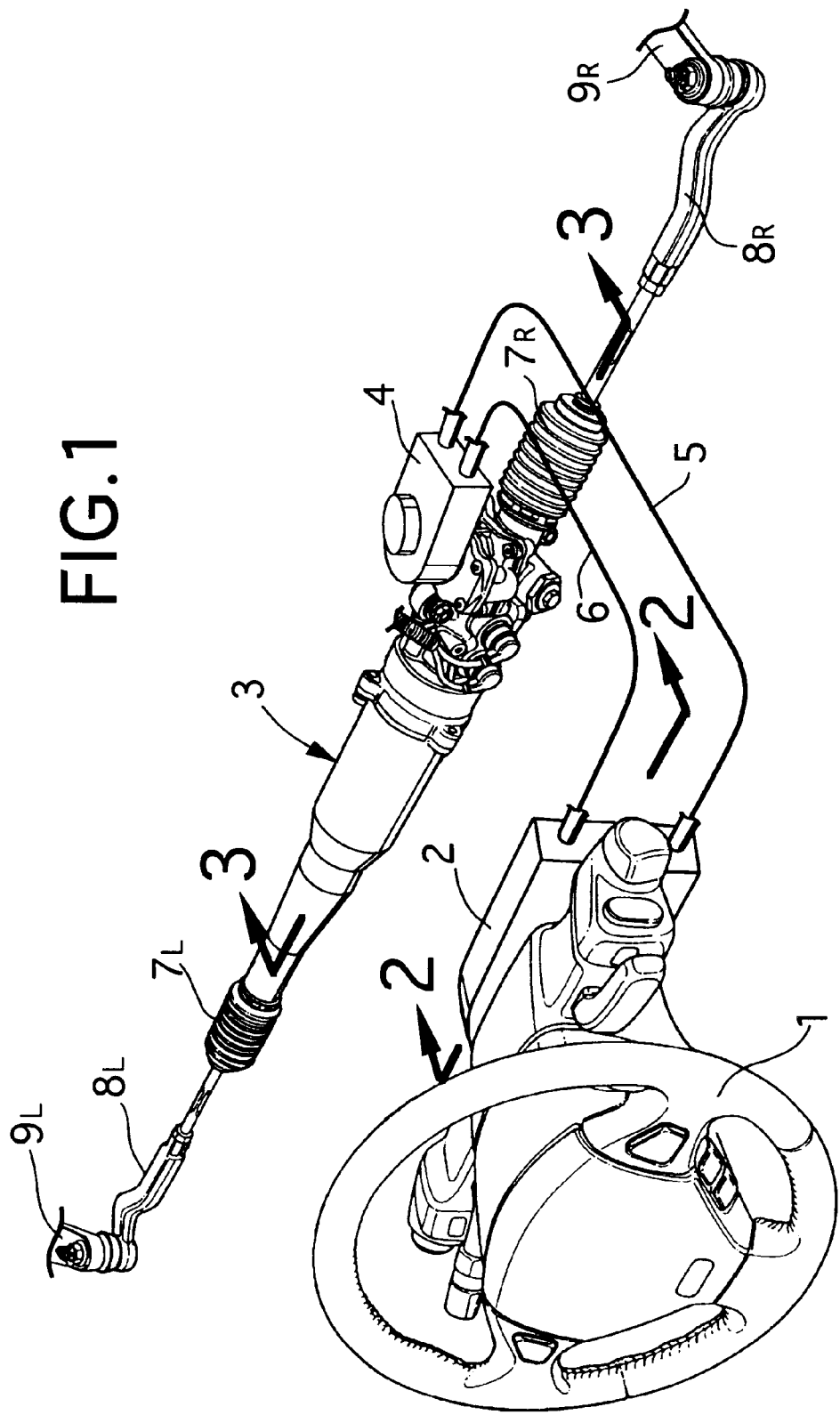

Referring to FIG. 1, a driving pulley housing 2 is provided in front of a handle or steering wheel 1 in a vehicle, and a follower pulley housing 4 is provided on a gear box 3. The driving and follower housings 2 and 4 are connected to each other by two Bowden wires 5 and 6. Tie rods $8_L$ and $8_R$ extend laterally of a vehicle body through boots $7_L$ and $7_R$ mounted at opposite ends of the gear box 3, and are connected to knuckles $9_L$ and $9_R$ which support left and right wheels (not shown).

Figure 2:
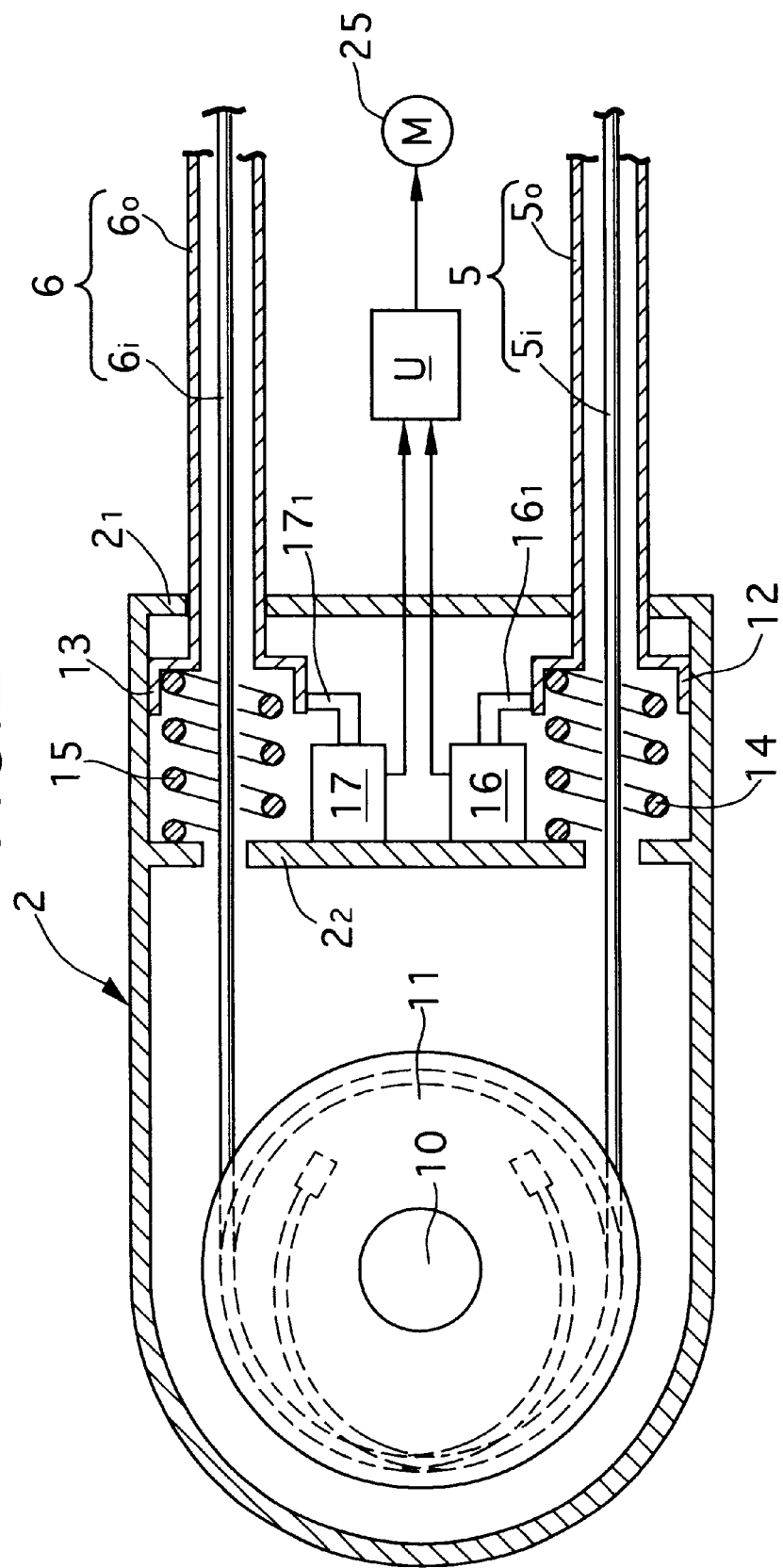

As shown in FIG. 2, a rotary shaft 10 rotated along with the steering wheel 1, extends within the driving pulley housing 2 and is secured to a driving pulley 11. The Bowden wire 5 comprises an outer tube 5o and an inner cable 5i slidably fitted in the outer tube 5o. Likewise, the Bowden wire 6 comprises an outer tube 6o and an inner cable 6i slidably fitted in the outer tube 6o.

The end of each of the inner cables 5i and 6i, is wound in opposite directions about one and half (1½) times, around an outer periphery of the driving pulley 11 and fixed to the outer periphery. Spring sheets 12 and 13 are formed by the extension of one end of the outer tubes 5o and 6o, respectively and are located between an end wall 21 and intermediate wall 22 formed on the driving pulley housing 2. Springs 14 and 15 are mounted under compression, between the intermediate wall 22 of the driving pulley housing 2 and the spring sheets 12 and 13 of the outer tubes 5o and 6o for biasing the outer tubes 5o and 6o. Therefore, the spring sheets 12 and 13 of the outer tubes 5o and 6o are movable in a longitudinal direction (the lengthwise direction of the Bowden wires 5 and 6) with expansion and shrinkage of the springs 14 and 15. A pair of differential transformers 16 and 17 are mounted on the intermediate wall 22 of the driving pulley housing 2. The differential transformers 16 and 17 have detectors $16_1$ and $17_1$ connected to the spring sheets 12 and 13, respectively.

Figure 3:
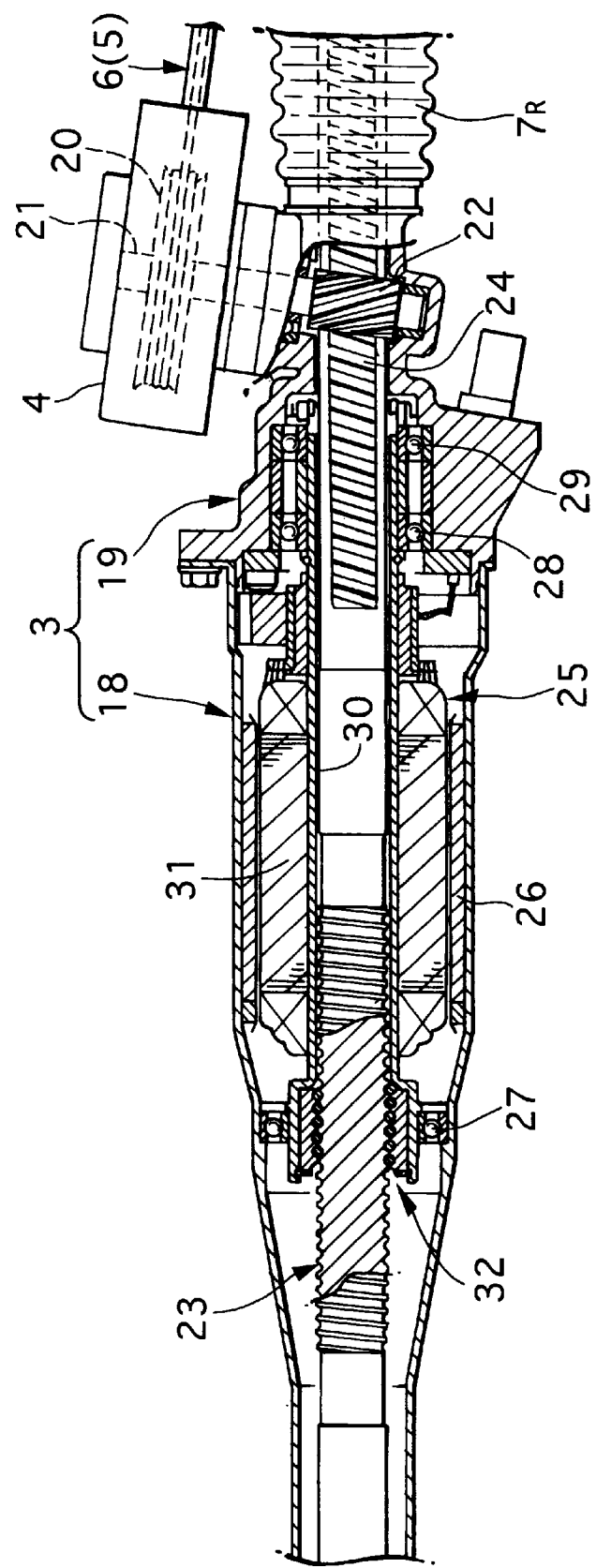

As shown in FIG. 3, the gear box 3 is divided into a left-side motor accommodating chamber 18 and a right-side rack and pinion accommodating chamber 19. The follower pulley housing 4 is supported in the right-side rack and pinion accommodating chamber 19. A rotary shaft 21 integral with a follower pulley 20, is provided in the follower pulley housing 4, and extends into the right-side rack and pinion accommodating chamber 19, and a pinion 22 is secured to the rotary shaft 21. A steering rod 23 is laterally slidably supported within the gear box 3 and is connected at opposite ends thereof to the tie rods $8_L$ and $8_R$. The pinion 22 is meshed with a rack 24 formed on the steering rod 23.

The other ends of the inner cables 5i and 6i of the two Bowden wires 5 and 6 are wound around and fixed to the outer periphery of the follower pulley 20, and the other ends of the outer tubes 5o and 6o fixed to the follower pulley housing 4 at proper locations.

A power-steering motor 25 which is in a motor accommodating chamber 18 in the gear box 3, includes a stator 26 secured to an inner peripheral surface of the motor accommodating chamber 18, a motor output shaft 30 rotatably supported on an inner peripheral surface of the motor accommodating chamber 18 through three ball bearings 27, 28 and 29 and fitted over an outer periphery of a steering rod 23, and a rotor 31 secured to the motor output shaft 30 and opposed to the stator 26. A ball screw mechanism 32 is positioned between an inner peripheral surface of the motor output shaft 30 and an outer peripheral surface of the steering rod 23, so that a steer-assisting force for reciprocally moving the steering rod 23 laterally, can be generated by driving the motor 25 to rotate and reverse the motor output shaft 30.

The operation of the first embodiment of the present invention described above will now be described.

For example, if the steering wheel 1 is rotated in a clockwise direction to turn the vehicle rightwards, the rotary shaft 10 is rotated in the clockwise direction along with the driving pulley 11 in FIG. 2. As a result, the inner cable 5i of the Bowden wire 5 is drawn, and the inner cable 6i of the Bowden wire 6 is loosened. This transmits the rotation of the driving pulley 11 to the follower pulley 20 to rotate the rotary shaft 21, thereby transmitting a steering torque to the rack 24 through the pinion 22.

Thus, the outer tube 5o is drawn leftwards as viewed in FIG. 2 against a resilient force of the spring 14 by increasing the tension of the inner cable 5i, thereby moving the detector $16_1$ of the differential transformer 16 by means of the spring sheet 12 of the outer tube 5o. On the other hand, the outer tube 6o is pushed rightwards as viewed in FIG. 2 by a resilient force of the spring 15 by decreasing the tension of the inner cable 6i, thereby moving the detector $17_1$ of the differential transformer 17 by the spring sheet 13 of the outer tube 6o.

The steering torque inputted to the steering wheel 1 is proportional to a difference between the tension of the pair of inner cables 5i and 6i, and the amount of relative movement of the pair of outer tubes 5o and 6o is proportional to such difference in tension. Therefore, the steering torque can be determined by detecting the amount of relative movement of the pair of outer tubes 5o and 6o by the differential transformers 16 and 17. The steering torque detected in this manner is calculated along with another control signal in an electronic control unit U. On the basis of the result, the steering-assisting torque generated by the power-steering motor 25 is controlled in a feedback manner, so that the difference between tensions of the inner cables 5i and 6i is substantially constant, i.e., so that the amount of relative movement of the pair of outer tubes 5o and 6o is substantially constant. Thus, the power-steering motor 25 is operated to bias the steering rod 23, thereby assisting the operation of the steering wheel 1 by a driver.

Even when the steering wheel 1 is rotated in a counter-clockwise direction to turn the vehicle leftwards, the steering torque of the steering wheel 1 can be detected in the same manner as when the steering wheel is rotated in the clockwise direction.

Since the steering wheel 1 and the gear box 3 are interconnected by the Bowden wires 5 and 6 having a flexibility as described above, the steering wheel 1 can be disposed in any position relative to the gear box 3, leading to a substantially enhanced degree of freedom of design. Thus, for example, the gear box 3 can be commonly used in right-side and left-side steering wheel vehicles, and structures of a tilting mechanism and a telescopic mechanism for the steering wheel 1 can be simplified.

Since a conventional steering shaft interconnecting the steering wheel 1 and the gear box 3 is not used, the transmission of vibration of the gear box 3 and/or the vibration of the engine are diminished, thereby providing an enhanced riding comfort. Further, a sufficient space at the driver's feet can be ensured to provide an enhanced comfort. Moreover, the steering wheel 1 can be turned forwards of the vehicle body and moved in a sufficient stroke on the collision of the vehicle and hence, a large shock absorbing effect can be exhibited. In addition, there is no possibility of a push-up generated by retreating of the steering shaft on the collision of the vehicle.

Further, since the steering torque is detected based on the tension of the Bowden wires 5 and 6, it can be reliably detected by a simple structure. Yet further, since the tension of the Bowden wires 5 and 6 are detected in the vicinity of the driving pulley 11, the influence of the friction and elongation of the Bowden wires 5 and 6 can be held to the minimum, and the steering torque can be correctly detected, thereby providing a steering assistance with a direct feeling similar to that provided when the steering shaft is used.

Figure 4:
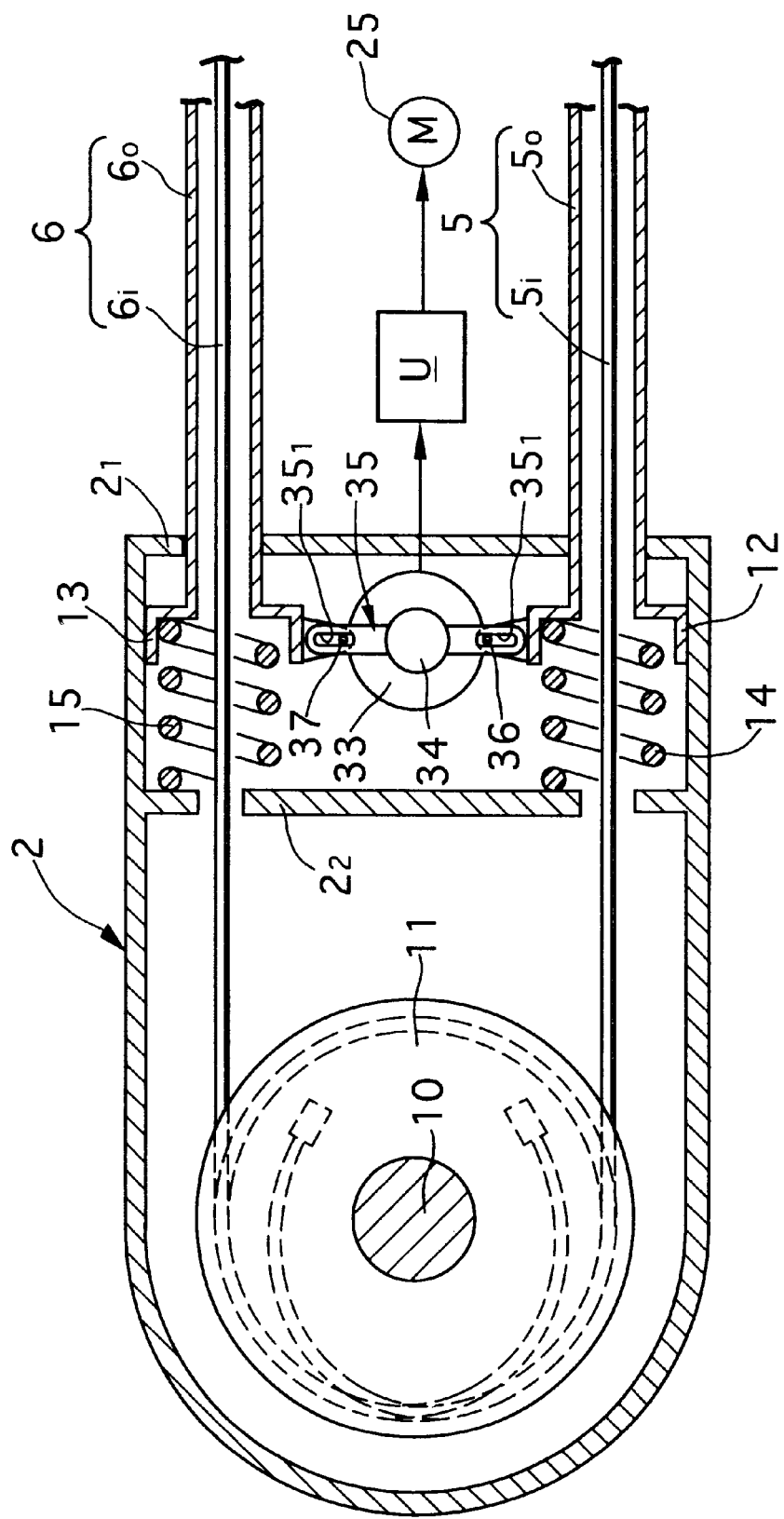
FIG. 4 is a view similar to FIG. 2, but illustrating a second embodiment of the present invention.

A second embodiment of the present invention will now be described with reference to FIG. 4.

In the second embodiment, a single potentiometer 33 is used in place of the pair of differential transformers 16 and 17 of the first embodiment. The potentiometer 33 is disposed between the end wall 21 and the intermediate wall 22 of the driving pulley housing 2, and pins 36 and 37 which are provided in spring sheets 12 and 13 of the pair outer tubes 5o and 60, are engaged in a pair of long holes $31_1$, $35_1$ defined in opposite ends of an arm 35 which is fixed to a detection shaft 34 of the potentiometer 33.

In this embodiment, if the pair of outer tubes 5o and 6o are longitudinally moved relative to each other depending upon the difference between the tension of the pair of inner cables 5i and 6i, the detection shaft 34 of the potentiometer 33 is rotated through the arm 35, and therefore, the steering torque of the steering wheel 1 can be determined based upon an output from the potentiometer 33. It is desirable that the arm 35 is formed from a material having a resilience, so that a large load is prevented from being applied to the arm 35, when the amount of movement of the pair of spring sheets 12 and 13 are unbalanced.

Even with the second embodiment, a function and an effect similar to those in the first embodiment can be provided.

A third embodiment of the present invention will now be described with reference to FIGS. 5 and 6.

In the third embodiment, steering torque is detected by rotating a detection shaft 39 of a potentiometer 38 depending upon tensioned states and loosened states of the inner cables 5i and 6i of the Bowden wires 5 and 6. More specifically, two arms 40 and 41 are fixed in a diverging arrangement or in a manner separated from each other at their tip ends, to the detection shaft 39 of the potentiometer 38 disposed between the inner cables 5i and 6i of the Bowden wires 5 and 6. Pulleys $40_1$ and $41_1$ are mounted at the separated tip ends of the arms 40 and 41 to abut against the inner cables 5i and 6i, respectively.

With this embodiment, if the driving pulley 11 is rotated in a direction of an arrow in FIG. 5, the tension of the inner cable 6i is increased, while the tension of the inner cable 5i is decreased. Therefore, the detection shaft 39 of the potentiometer 38 is rotated in the direction of the arrow by urging the roller $41_1$ as a result of a force provided when the inner cable 6i with an increased tension, is elongated rectilinearly. Reversely, if the driving pulley 11 is rotated in a direction of an arrow in FIG. 6, the tension of the inner cable 5i is increased, while the tension of the inner cable 6i is decreased. Therefore, the detection shaft 39 of the potentiometer 38 is rotated in the direction of the arrow by urging the roller $40_1$ as a result of a force provided when the tension of inner cable 5i is increased, and it is elongated rectilinearly.

In the first and second embodiments, the steering torque is detected based on the movement of the outer tubes 5o and 6o in the longitudinal direction (i.e., in the lengthwise direction of the Bowden wires 5 and 6). In contrast, in the third embodiment, the steering torque is detected based on the movement of the inner cables 5i and 6i in the lateral direction (i.e., in a direction perpendicular to the lengthwise direction of the Bowden wires 5 and 6). However, a function and effect similar to that in the first and second embodiments can be provided in the third embodiment.

The differential transformers 16 and 17 or the potentiometers 33 or 38 are used as steering-torque detecting means in the embodiments, but in place of the differential transformers 16 and 17 or the potentiometer 33 or 38, any other detecting means such as a magnetic detecting means or an optical detecting means may also be used.

Although the embodiments of the present invention have been described in detail, it will be understood that the present invention is not limited to the above-described embodiments, and various modifications may be made without departing from the spirit and scope of the invention defined in claims.

What is claimed is:

1. A steering system for a vehicle, comprising a driving pulley connected to a steering wheel; a follower pulley connected to a gear box for steering the vehicle wheels; a wire interconnecting said driving and follower pulleys such that steering torque inputted to said steering wheel is transmitted to said gear box through said wire, said wire comprising an outer member and an inner member slidably inserted into said outer member; a steering-torque detecting means for detecting the steering torque at a position between said steering wheel and said follower pulley; a power-steering motor for assisting the operation of said steering wheel; and a control means for controlling said power-steering motor in response to the steering torque detected by said steering-torque detecting means, wherein a change in tension of the inner member of the wire is detected by the steering torque detecting means for detecting the steering torque.

2. A steering system for a vehicle according to claim 1, wherein said steering-torque detecting means detects the steering torque as a function of the tension of said wire.

3. A steering system for a vehicle according to claim 1, wherein said steering-torque detecting means detects the steering torque as a function of the amount said inner member moves in a lateral direction thereof, in response to a change in the tension of said inner member.

4. A steering system for a vehicle according to claim 3 wherein said steering torque detecting means include a potentiometer for detecting the lateral movement of said inner member.

* * * * *